United States Patent [19]

Huige et al.

[11] Patent Number: 4,970,082

[45] Date of Patent: Nov. 13, 1990

[54] PROCESS FOR PREPARING A NONALCOHOLIC (LESS THE 0.5 VOLUME PERCENT ALCOHOL) MALT BEVERAGE

[75] Inventors: Nick J. Huige, Brookfield; Gilbert W. Sanchez, Menomonee Falls; Alan R. Leidig, Glendale, all of Wis.

[73] Assignee: Miller Brewing Company, Milwaukee, Wis.

[21] Appl. No.: 498,529

[22] Filed: Mar. 26, 1990

Related U.S. Application Data

[63] Continuation-in-part of Ser. No. 428,084, Oct. 27, 1989, abandoned.

[51] Int. Cl.$^5$ .............................................. C12C 11/00
[52] U.S. Cl. .................................... 426/16; 426/14; 426/29; 426/592
[58] Field of Search ...................... 426/11, 12, 14, 16, 426/15, 29, 592, 600

[56] References Cited

U.S. PATENT DOCUMENTS

| | | | |
|---|---|---|---|
| 4,661,355 | 4/1987 | Schur | 426/15 |
| 4,746,518 | 5/1988 | Schur | 426/15 |
| 4,788,066 | 11/1988 | Witt | 426/14 |
| 4,790,993 | 12/1988 | Schedl et al. | 426/14 |

FOREIGN PATENT DOCUMENTS

| | | | |
|---|---|---|---|
| 0151668 | 8/1985 | European Pat. Off. | 426/14 |
| 0245845 | 11/1987 | European Pat. Off. | 426/14 |

*Primary Examiner*—Marianne Cintinis
*Attorney, Agent, or Firm*—Quarles & Brady

[57] ABSTRACT

Malt beverages having less than 0.5% v/v alcohol content are made by combining wort with a thick yeast slurry and fermenting sugars in the wort at 38° F. to 45° F. for 0.5 to 10 hours. The wort has a high extract content, at least 14% by weight. The yeast slurry is obtained from a prior beer fermentation and includes at least 10% by weight of yeast and the balance beer. The wort is combined with at least 10% to 20% v/v of the yeast slurry in the fermentation step.

9 Claims, No Drawings

PROCESS FOR PREPARING A NONALCOHOLIC (LESS THE 0.5 VOLUME PERCENT ALCOHOL) MALT BEVERAGE

This application is a continuation-in-part of application Ser. No. 07/428,084 filed on Oct. 27, 1989 now abandoned.

FIELD OF THE INVENTION

The present invention relates to a malt beverage and process for its preparation that contains less than 0.5% alcohol on a volume/volume basis.

BACKGROUND OF THE INVENTION

The following terms used in this description and claims are defined as follows: "beer" means a malt beverage with an alcohol content of at least in the range of 3–5.5% v/v, "low alcohol beer" means a malt beverage with an alcohol content of 1–3% v/v, and "nonalcoholic malt beverage" means a malt beverage with an alcohol content of less than 0.5% v/v. The present invention relates specifically to the latter category of beverages, i.e. nonalcoholic malt beverages.

Most of the methods that have been proposed and/or practiced for the production of low alcohol beers or nonalcoholic malt beverages can be listed as including:

(1) fermentation with *Saccharomycodes ludwigii* yeast which is capable of fermenting glucose, sucrose and fructose sugars but not maltose;
(2) interrupted fermentation techniques that halt conventional beer fermentation at a low alcohol level by suddenly increasing the pressure or lowering the temperature;
(3) high temperature mashing to produce a wort with low fermentability;
(4) the Barrel system involving mixing two beers made from worts of different specific gravities;
(5) alcohol removal from beer by distillation, such as vacuum stripping combined with de- and re-esterification;
(6) alcohol removal from beer by reverse osmosis;
(7) alcohol removal from beer by vacuum evaporation;
(8) alcohol removal from beer by dialysis; and
(9) the cold contact method.

Our development work relating to the present invention concluded that processes such as those of (1)–(8) above are less desirable for the production of a nonalcoholic malt beverage for various reasons: some of these processes result in a beverage of poor or unacceptable flavor, some require high energy or capital costs, and others can only be run at uneconomical low rates of production. Our present invention relates specifically to a cold contact process for the production of nonalcoholic malt beverages and the beverages produced thereby.

An early (1978) disclosure of a cold contact method is found in Kokai No. 53-127861 according to which wort of 15–25% Balling is brought into contact with 1.5–2% w/w beer yeast for a period of up to 72 hours, preferably 16–24 hours, at a temperature of −5° C. to 10° C., preferably −2° C. to 2° C.; after separation of the yeast, the remaining solution is diluted with water, its pH adjusted with lactic acid and the product is then carbonated. This process is said to provide a carbonated malt beverage without forming alcohol. Another cold contact process is described in U.S. Pat. No. 4,661,355 and its related patent U.S. Pat. No. 4,746,518 wherein wort is diluted to about 6 to 12% w/w solids and pH adjusted to 4 whereafter it is brought into contact with yeast that is free of alcohol for a period of 24 to 48 hours at a temperature of −0.4° C. or less; this is followed by yeast separation and carbonation steps to produce a finished beverage. The process is stated in these patents to result in a carbonated malt beverage with less than 0.05% by weight of alcohol.

SUMMARY OF THE INVENTION

Our present invention provides a new cold contact process for the production of nonalcoholic malt beverages including the steps of (1) providing a wort with an extract content of at least about 14% to 20% by weight that contains fermentable sugars;
(2) providing a thick yeast slurry freshly harvested from a beer fermentation containing at least 10% yeast by weight and the balance beer;
(3) combining the wort with at least 10% to 20% v/v of the yeast slurry to provide a cell count of at least 100,000,000 yeast cells/ml pitched wort and fermenting sugars in the wort for a period of one-half to ten hours at a temperature in the range of 38° F. to 45° F. to provide a fermented brew with a target alcohol content;
(4) removing the yeast from the fermented brew; and thereafter
(5) finishing the fermented brew by aging, dilution as required and carbonation to provide a carbonated malt beverage with an alcohol content of less than 0.5% v/v.

Our invention provides a nonalcoholic malt beverage having excellent flavor and aroma characteristics. The process of our invention differs from the processes described in Kokai No. 53-127861 and U.S. Pat. Nos. 4,661,355 and 4,746,518 in various respects, including for example, wort composition, yeast slurry composition, the temperature at which the wort and yeast slurry are in contact with one another, the concentration of yeast during contact with the wort, fermentation of sugars in the wort, and the greatly reduced contact time in our process as compared to contact times described in the patent literature.

DESCRIPTION OF PREFERRED EMBODIMENTS

The following sections (1)–(5) present a description of the process steps of our invention in such full and concise detail as will enable its practice by those in the brewing art.

(1) Wort Preparation. An extract is prepared by mashing malted barley, and an adjunct cereal if desired, in hot water to enzymatically convert the starches of the malt and any adjunct to fermentable sugars. Some caramel malt is preferably included to add flavor. In the brew kettle, a liquid adjunct, such as corn syrup can be added to the wort. The wort preferably includes about 40 to 50% each of malt and adjunct and 0 to 10% caramel malt, on an extract weight basis. The wort is hopped with sufficient hops and/or hop extract to provide about 25 to 50 Bitterness Units (BUs). The wort is clarified and cooled as necessary before combining with yeast slurry in a subsequent step of the process.

Thus, the initial step in our new process is to provide a wort that has an extract content of at least about 14% to 20% by weight and contains fermentable sugars; the proportions of water, malt and adjunct, when used, employed in the wort preparation stage are selected to produce a wort of this composition. Our process employs wort at a higher extract content than processes described in the patent literature, and the wort is not diluted before the fermentation stage. We have found that this is an advantage as it enables a higher rate of reduction of aldehydes in the wort by yeast during fermentation without having to add an unduly excessive amount of yeast. The wort can be cooled with a standard wort cooler to the temperature selected for the fermentation stage before it is pitched with the yeast slurry for fermentation.

(2) Yeast. The yeast used in the process of our invention is to be a thick yeast slurry or cream freshly harvested from a prior beer fermentation, and the slurry is to contain both yeast cells and beer. Specifically, the yeast slurry is to contain at least 10% to 20% by weight of yeast solids and the balance beer. The yeast slurry may be obtained from bottom fermented beer, in which case it will typically include about 6.5% v/v alcohol, and our invention thus differs from prior art cold contact processes that are based upon using a yeast that is free of alcohol. We have found that contacting the wort with a yeast slurry containing beer adds to the flavor of the finished beverage since our beverage incorporates beer volatiles and flavors to compensate for the lack thereof in a typical nonalcoholic malt beverage. Approximately 30% to 80% of the alcohol in the finished nonalcoholic beverage of our invention comes from the beer included in the yeast slurry.

The yeast is most usefully a typical bottom-fermenting brewer's yeast, *S. uvarum*. The yeast preferably is washed with acid after being freshly harvested from a beer fermentation and may be cooled to the selected fermentation temperature before combining with the wort.

(3) The next step in our process is that of combining, i.e. pitching, the wort with 10% to 20% v/v of the yeast slurry, each as defined above, to provide a cell count of at least 100,000,000 yeast cells/ml, or preferably at least 135,000,000 yeast cells/ml, of pitched wort and fermenting sugars in the wort at a temperature of 38° F. to 45° F. for a period of 0.5 to 10 hours, or preferably 3 to 10 hours, to prepare a fermented brew having a target alcohol content.

The fermentation is carried out in a closed fermentation vessel. The wort and yeast slurry are cooled to the temperature selected for fermentation before combining in the fermenter. The fermentation is to be carried out at a temperature in the range of 38° F. to 45° F. in accordance with our invention. This aspect of our invention differs from cold contact processes of the patent literature in which wort and yeast are contacted at a temperature of around 32° F.; an advantage of our process is that it eliminates the need for additional cooling apparatus or conditions to reach a temperature as low as 32° F. and provides a more practical process for the typical brewery. Another advantage is that there is no danger in our process of ice formation in the fermenter or on the cooling surfaces. Further, our process involves fermentation of sugars in the wort, whereas the cold contact processes of at least some of the patent literature discussed above do not include a fermentation stage.

The fermentation is to be carried out with little or no oxygen in the fermenter in order to provide a reducing environment conducive to allowing the yeast to reduce aldehydes in the brew. Thus, aeration of wort and yeast should be avoided when they are added to the fermenter; it is useful to purge the fermenter with $CO_2$ prior to filling and it also is useful to purge the wort in the fermenter with $CO_2$.

Another novel characteristic of our process is the high concentration of yeast combined with the wort for the fermentation. Our process uses 10% to 20% v/v of yeast slurry, to provide a cell count of at least about 100,000,000 cells of yeast/ml of pitched wort; most usefully, the cell count of the wort is about 150,000,000 cells of yeast/ml of pitched wort. This is a higher concentration of yeast in the contact step than generally described in the patent literature. We have found that the high concentration of yeast is advantageous in that there is more reduction of aldehydes present in the wort, which in turn, enhances the flavor of the finished beverage and decreases the worty taste of the beverage.

Another novel characteristic of our invention is that the fermentation is carried out for a short period of time of only 0.5 to 10 hours. This is in sharp contrast to the long contact times taught by the patent literature, which range from 24 hours to 72 hours. The short contact time of our process has obvious advantages, such as for example, reducing the cost of producing a nonalcoholic malt beverage and freeing up fermenter capacity.

We have found it useful that the fermentation stage of our process be carried to a target alcohol content that is higher than that selected for the finished beverage, and that the fermented brew be diluted with water to reach the alcohol content selected for the finished nonalcoholic beverage. Thus, we prefer that the fermentation step be carried out for a time sufficient to provide fermented, or green, brew having a target alcohol content of about 1 to 2% v/v.

(4) Yeast Removal. After fermentation of the wort has been carried out to a target alcohol content, the yeast is separated from the freshly fermented brew. This can be accomplished by any of the usual brewer yeast separation techniques, such as decanting the brew or separating the yeast with a centrifuge, followed by filtration.

(5) Finishing the Beverage. After the yeast has been separated, the fermented brew is finished by a combination of steps similar to those typically practiced in the brewing art. The fermented brew is first aged for a few days, such as about 2 to 4 days, so as to develop desired flavor characteristics. The brew from the fermenter is to be diluted as required with de-aerated chilled carbonated water to a finished alcohol content of less than 0.5% v/v. Thus, if the target alcohol content selected for fermentation is higher than 0.5% v/v, the fermented brew should be diluted to a finished alcohol content of less than 0.5% v/v. The brew can be diluted before or after aging, and the dilution can be carried in one or more stages to reach the finished alcohol content. Post-kettle hopping materials can be added in an amount sufficient to provide a desired bitterness in the finished beverage; in general, we prefer that the finished beverage has about 12 to 15 BUs. Also, chillproofing agents such as silica gel or PVPP can be used to stabilize the beverage. The beverage is filtered, carbonated to a selected level, typically in the range of about 2.5 to 3 volumes of carbon dioxide, and then packaged in kegs, or packaged in bottles or cans and then pasteurized.

The following Example describes a specific malt beverage having an alcohol content of less than 0.5% v/v that was produced in accordance with the process of our invention as described above.

EXAMPLE 1

Eight hundred twenty barrels of wort including fermentable sugars were prepared by mashing a brew containing malt, caramel malt and water in successive stages up to about 170° F. Corn syrup was added as a liquid adjunct in the brew kettle. The brew was hopped with a combination of hops and hop extract to a level of 42 BUs. The wort contained, on an extract weight basis, about 51% malt, 6% caramel malt and 43% liquid adjunct in sufficient quantities to provide a wort having 15.1% extract by weight including fermentable sugars. The trub was removed by settling in a hot wort tank. The wort was then cooled with a wort cooler to 42° F.

A thick bottom-fermenting brewer's yeast slurry was freshly harvested from a prior pellet hopped beer fermentation and washed with acid. The slurry consisted of 14% by weight of yeast cells and 86% by weight of beer, and had an alcohol content of about 6.5% v/v. The yeast slurry was cooled to about 42° F.

The wort and the yeast slurry were combined at 42° F. in a closed fermenter that had first been purged with carbon dioxide. The wort was transferred to the fermenter under conditions to avoid aeration of the wort; also, carbon dioxide was bubbled through the wort after the fermenter was filled. 134 barrels of yeast slurry were combined with 820 barrels of wort in the fermenter. After pitching, the wort had a content of 143,000,000 yeast cells/ml wort. After the fermenter was filled, the wort was fermented for a period of about 6 hours at a temperature of 42° F. to an alcohol content of 1.14% v/v. After reaching this alcohol content, the yeast was removed from the wort by centrifuging. Following yeast removal, the fermented brew was primary filtered and pumped to aging where it was diluted with deaerated chilled carbonated water to an alcohol content of 0.6% v/v and aged for three days in an aging tank purged with carbon dioxide. Following aging, the brew was chillproofed by contacting with 135 pounds of silica gel and diluted a second time to a finished alcohol content of 0.39% v/v and its bitterness adjusted to 12.9 BUs by adding post kettle hop extracts. The beverage was then final filtered and carbonated to a level of about 2.6 volumes of carbon dioxide and packaged in kegs and bottles, following which the bottled beverage was pasteurized.

The beverage of this example consisted of a nonalcoholic malt beverage having 0.39% v/v alcohol content. Blind taste testing of the beverage conducted in accordance with accepted brewery procedures established that the beverage had excellent flavor and aroma, resulting in a most satisfying nonalcoholic beverage possessing most of the flavor and volatile characteristics of beer.

The foregoing describes a new process for the preparation of a malt beverage having an alcohol content less than 0.5% v/v comprising a combination of essential process steps including (1) providing a wort with a high extract content including fermentable sugars as stated above, (2) providing a yeast slurry from a prior beer fermentation that has a specified content of both yeast solids and beer, (3) pitching the wort with the yeast slurry at a high concentration of yeast cells as stated, and (4) fermenting sugars in the wort for 0.5 to 10 hours at a temperature in the range of 38° F. to 45° F. The combination of these steps as defined is critical to obtaining the new nonalcoholic malt beverage disclosed herein that has only less than 0.5% v/v alcohol but also has most of the taste characteristics of beer.

We claim:

1. In a process for producing a nonalcoholic malt beverage having an alcohol content of less than 0.5% alcohol v/v of the type in which a wort containing fermentable sugars is contacted with yeast, the improvement wherein the process comprises the steps of:
   (1) providing a wort that has an extract content of at least 14% to 20% by weight including fermentable sugars;
   (2) providing a thick yeast slurry from a prior beer fermentation containing at least 10% by weight of yeast solids and the balance beer;
   (3) combining the wort with at least 10% to 20% v/v of the yeast slurry to provide a cell count of at least about 135,000,000 yeast cells/ml of pitched wort, and fermenting sugars in the wort for a period of 3 to 10 hours at a temperature in the range of 38° F. to 45° F. to a target alcohol content;
   (4) removing the yeast from the fermented brew; and
   (5) finishing the fermented brew by aging, diluting if the target alcohol content is greater than 0.5% v/v an carbonating to provide a carbonated malt beverage having an alcohol content of less than 0.5% v/v.

2. The method of claim 1 wherein the fermentation is carried out to provide a target alcohol content of about 1 to 2% v/v, and the fermented brew is diluted with sufficient deaerated water after removal of the yeast to provide a beverage having a finished alcohol content less than 0.5% v/v.

3. The method of claim 1 wherein the fermentation takes place in a substantially oxygen-free environment.

4. The method of claim 1 wherein about 30% to 80% of the alcohol content of the finished beverage is from the yeast slurry and the balance is from the fermentation of the wort.

5. In a process for producing a nonalcoholic malt beverage having an alcohol content of less than 0.5% alcohol v/v of the type in which a wort containing fermentable sugars is contacted with yeast, the improvement wherein the process comprises the steps of:
   (1) providing a wort that has an extract content of at least 14% to 20% by weight including fermentable sugars;
   (2) providing a thick yeast slurry from a prior beer fermentation containing at least 10% by weight of yeast solids and the balance beer;
   (3) combining the wort with at least 10% to 20% v/v of the yeast slurry to provide a cell count of at least about 100,000,000 yeast cells/ml of pitched wort, and fermenting sugars in the wort for a period of about 0.5 to 10 hours at a temperature in the range of 38° F. to 45° F. to a target alcohol content;
   (4) removing the yeast from the fermented brew; and
   (5) finishing the fermented brew by aging, diluting if the target alcohol content is greater than 0.5% v/v and carbonating to provide a carbonated malt beverage having an alcohol content of less than 0.5% v/v.

6. The method of claim 5 wherein the fermentation is carried out to provide a target alcohol content of about 1 to 2% v/v, and the fermented brew is diluted with sufficient deaerated water after removal of the yeast to provide a beverage having a finished alcohol content less than 0.5% v/v.

7. The method of claim 5 wherein the fermentation takes place in a substantially oxygen-free environment.

8. The method of claim 5 wherein about 30% to 80% of the alcohol content of the finished beverage is from the yeast slurry and the balance is from the fermentation of the wort.

9. The method of claim 5 wherein the fermentation is carried out for a period of about 0.5 to 3 hours.

* * * * *